United States Patent [19]

Henderson et al.

[11] 4,456,329

[45] Jun. 26, 1984

[54] OPTICAL DEVICE HAVING MULTIPLE WAVELENGTH DEPENDENT OPTICAL PATHS

[75] Inventors: James A. Henderson, Finksburg; Gary E. Marx, Sykesville, both of Md.

[73] Assignee: Westinghouse Electric Corp., Pittsburgh, Pa.

[21] Appl. No.: 326,235

[22] Filed: Dec. 1, 1981

Related U.S. Application Data

[63] Continuation of Ser. No. 84,216, Oct. 12, 1979, abandoned.

[51] Int. Cl.³ .............................................. G02B 5/172
[52] U.S. Cl. .................... 350/96.16; 350/96.18
[58] Field of Search ............... 350/96.15, 96.16, 96.18

[56] References Cited

U.S. PATENT DOCUMENTS

| 3,874,779 | 4/1975 | Thiel | 350/96.16 |
| 3,874,780 | 4/1975 | Love | 350/96.16 |
| 4,130,345 | 12/1978 | Doellner | 350/96.15 X |
| 4,176,908 | 12/1979 | Wagner | 350/96.15 |
| 4,213,677 | 7/1980 | Sugimoto et al. | 350/96.18 |
| 4,285,571 | 8/1981 | Winzer | 350/96.18 |
| 4,400,054 | 8/1983 | Biard et al. | 350/96.15 |

FOREIGN PATENT DOCUMENTS

| 54-9946 | 1/1979 | Japan | 350/96.15 |
| 54-20750 | 2/1979 | Japan | 350/96.15 |
| 54-104359 | 8/1979 | Japan | 350/96.15 |

OTHER PUBLICATIONS

Lynch, "Fiber Optic Connectors", *IBM Tech. Discl. Bull.,* vol. 13, No. 2, Jul. 1970, pp. 533-534.
Bloem et al., "Fiber-Optic Coupler", *IBM Tech. Discl. Bull.,* vol. 16, No. 1, Jun. 1973, pp. 146-147.
"Simple Coupler Taps Fiber-Optic Cables", *Electronics,* Dec. 20, 1973, p. 30.
Taylor et al., "Data Busing With Fiber Optics", *Naval Research Reviews,* vol. 28, No. 2, Feb. 1975, pp. 12-25.
Ueno et al., "Data Highway Using Optical Fiber Cable", *Conf. on Laser & Electr-Optical Systems,* Paper THE2, May 1976, 2 pages.
Kobayashi et al., "Micro-Optics Devices for Branching, Coupling . . . ", *Int'l. Conf. on Int. Optics & Opt. Fiber Commun.,* Paper B11-3, 1977, 4 pages.

*Primary Examiner*—John D. Lee
*Attorney, Agent, or Firm*—J. B. Hinson

[57] ABSTRACT

An optical system providing multiple wavelength dependent optical paths and using graded index of refraction optical elements is disclosed. The dimensions of the graded index of refraction optical elements are selected such that each optical path is one focusing length. Dichroic elements are utilized to differentiate between the optical paths on a wavelength basis.

7 Claims, 8 Drawing Figures

U.S. Patent  Jun. 26, 1984  Sheet 1 of 3  4,456,329
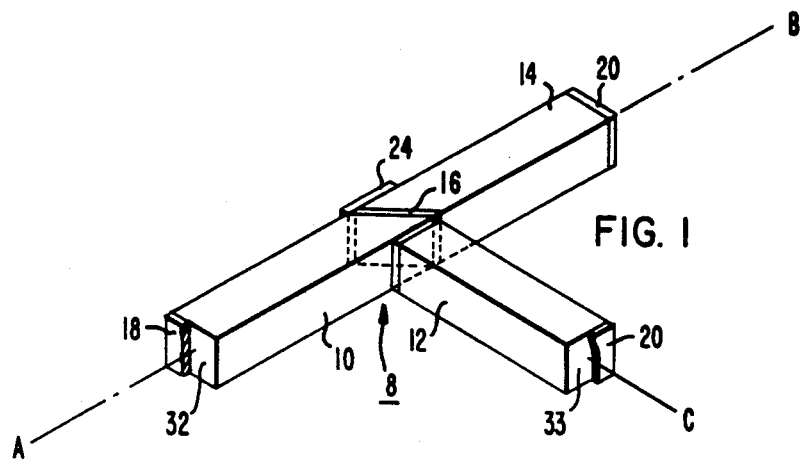
FIG. 1
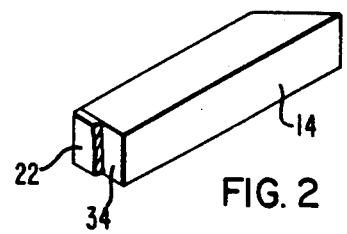
FIG. 2
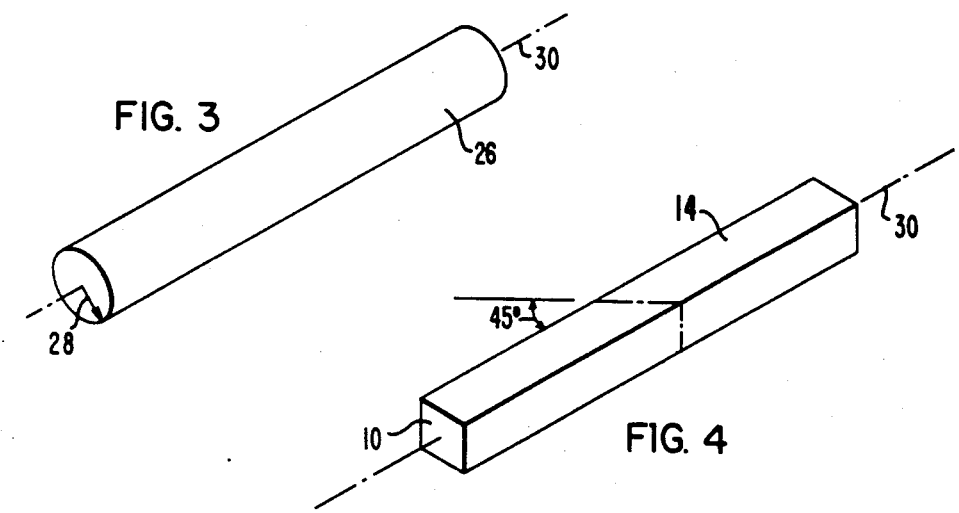
FIG. 3
FIG. 4

OPTICAL DEVICE HAVING MULTIPLE WAVELENGTH DEPENDENT OPTICAL PATHS

This is a continuation of application Ser. No. 084,216, filed Oct. 12, 1979, now abandoned.

BACKGROUND OF THE INVENTION

1. Field of the Invention

The invention relates to optical devices and more specifically to an optical device having at least two wavelength dependent paths and utilizing optical elements having a graded index of refraction.

2. Description of the Prior Art

Prior art multipath optical devices have typically utilized fixed lenses and wavelength dependent reflectors. These systems required careful mechanical alignment and were rather bulky due to the size of the lenses required. Additionally, the lenses and reflectors required complicated mechanical structures for support. The net result of these features was that the system was bulky, expensive, difficult to align and maintain.

SUMMARY OF THE INVENTION

The preferred embodiment of the invention comprises an optical device having a plurality of wavelength dependent optical paths therethrough with all of said paths terminating at at least one common point. Optical components fabricated using members having a graded index of refraction are utilized to form the optical paths with each path being one focusing length long. Dichroic layers are selectively positioned within the optical device to distinguish between the optical paths on a wavelength basis.

DESCRIPTION OF THE DRAWINGS

FIG. 1 is a drawing illustrating the preferred embodiment of the invention.

FIG. 2 is a drawing illustrating a second view of one of the optical components utilized in the preferred embodiment of the invention.

FIG. 3 is a diagram of an optically transparent rod having a graded index of refraction.

FIG. 4 is a drawing of an optical member having a square cross section.

DESCRIPTION OF THE PREFERRED EMBODIMENT

Figure 5:
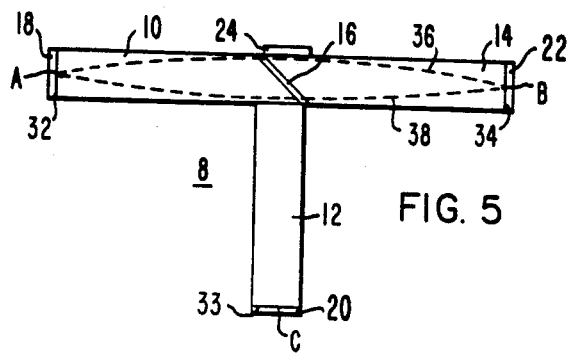
FIG. 5 is a diagram illustrating a first wavelength dependent transmission path through the device illustrated in FIG. 1.

FIG. 1 is a drawing illustrating a multipath optical device 8 which comprises the preferred embodiment of the invention. The preferred embodiment of the invention provides a device having two wavelength dependent optical paths with the first path being along a line A-B and the second being along a line A-C. Paths A-B and A-C also correspond to the optical axes of the multipath wavelength dependent optical device 8.

Structurally the preferred embodiment of the invention, optical device 8, comprises three optically transparent members 10, 12 and 14 made of material having a graded index of refraction. Two of the optically transparent members 10 and 14 are substantially identical and have a preferably square cross section with a first end being substantially perpendicular to the optical axis and the second end being substantially 45° with respect to the optical axis. The first and second optically transparent members 10 and 14 are positioned with the ends having a cross section approximately 45° with respect to the optical axis in abutting relationship and separated by a thin dichroic layer 16. First and second optically transparent members 10 and 14 are affixed, preferably by a suitable adhesive, to the surfaces of the dichroic layer 16 to form a rigid structure. The third optically transparent member 12 is affixed to the long edge of the first optically transparent member 10, preferably with a suitable adhesive. If required, the ends (32 and 33, FIG. 1) and 34, FIG. 2) of the optically transparent members 10, 12 and 14 may have affixed thereto anti-reflective coatings 18, 20 and 22. Additionally, a small portion of the long edge of optically transparent member 14 may also be coated with an anti-reflective coating 24. These coatings, the various members and their functions will be described in more detail subsequently.

FIG. 3 is a drawing of an optically transparent rod 26 from which the optically transparent members 10, 12 and 14 are fabricated. The optically transparent rod 26 has a graded index of refraction along the radius 28. By graded index of refraction, it is meant that the index of refraction decreases at or near a parabolic rate as the radial distance from the optical axis 30 increases linearly. Rods having these characteristics are commercially available.

The optically transparent rod 26 is first shaped to produce a member having a rectangular (preferably square cross section) as illustrated in FIG. 4. This can be done by grinding or other suitable means. The ends are then cut perpendicular to the optical axis 30 and the two ends of the rod are polished. A length of the rod 26 is selected to be one of focusing length at the desired operating wavelength after the ends have been polished. The rod is then cut at a 45° angle to generate the two substantially identical optical members 10 and 14 described above. Optical transparent 12 may be fabricated in a similar fashion. The length of optical member 12 is selected to produce a path of one focusing length between the square end surface 32 of optical member 10 and the square end surface 33 of optical member 12.

FIG. 5 is a drawing illustrating the operation of the optical device 8 for a ray which enters the optical device 8 along an optical A-B axis. Since the optical path A-B is one focusing length, the ray which enters the flat surface 32 of the first optical member 10 near its center (optical axis), will be transmitted to a point on the optical axis at the flat surface 34 of the second optical member 14. During the transmission of this ray from surface 32 to surface 34 the light will be contained within an area between the two dotted lines 36 and 38.

The desired lengths for the combination of the first optical member 10 and the second optical member 14 is one focusing length. That is, light entering the first optical member 10 along any portion of the surface 32 will be transmitted to the corresponding portion of surface 34 of optical member 14. To achieve this type of operation it is necessary to select the dichroic layer 16 such that it is transparent to the wavelength to be transmitted along path A-B. As is common in the art, the anti-reflective coatings 18 and 22 are selected to minimize reflections as the beam enters or exits the optical members 10 and 14. Functionally the light to be transmitted can enter the path A-B either at point A or point B. That is, light of the appropriate wavelength can be transmitted in either direction along this path.

Figure 6:
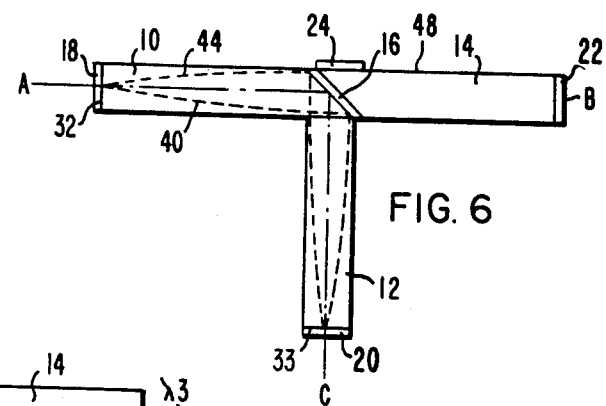
FIG. 6 is a diagram illustrating a second path through the device illustrated in FIG. 1.

FIG. 6 illustrates the operation of the optical device 8 for a ray which enters the device along the optical axis A-C. This path is utilized by selecting a wavelength which will be totally reflected by dichroic layer 16. Functionally, light entering the flat surface 32 of the first optical member 10 at its optical axis will be contained within the two dotted lines 40 and 44 to be transmitted to the center of the surface 33 of optical member 12. Similarly, light entering surface 32 at any other point will be transmitted to the corresponding point of surface 33. Thus, optically the distance between the surface 32 and the surface 33 is one focusing length. Selection of a suitable dichroic for layer 16 and the outer reflecting coatings is well known to those skilled in the art. Path A-C is also bi-directional.

As previously described the optical paths A-B and A-C are bi-directional. That is, light may be transmitted in either direction so long as the proper wavelength is utilized for the path selected.

As is well known in the art, dichloric layers 16 are not completely reflective. That is to say that 100% of the light entering at point C will not be reflected to A by the dichroic layer 16. The light which is not reflected by the dichroic layer 16 will continue through and appear at the edge surface 48 of optical member 14. A anti-reflective coating 24 is placed along this surface so that any light which is transmitted through the dichroic layer 16 will exit from the system and not result in additional reflections. Similarly, if light is to be transmitted along path A-C, the portion of the light not reflected by dichroic layer 16 is transmitted out along path B through the anti-reflective coating 22 and thus exits from the device.

In addition to the anti-reflective coatings and dichroic reflected areas described above, filter layers may be added either at the flat end surface 32 or 34 or at the junction of members 10 and 12. These filters are selected to remove wavelengths that are not desired to be transmitted along the path in which the filters appear.

Figure 7:
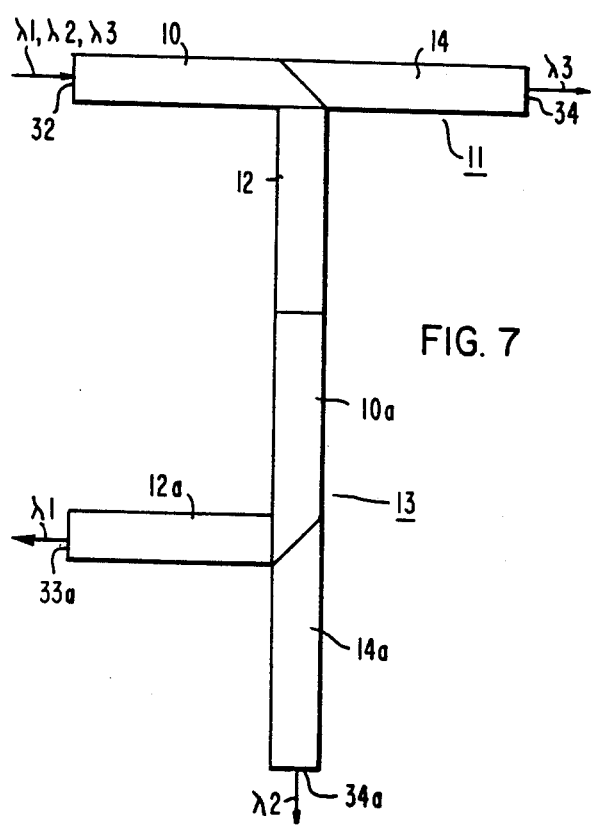
FIG. 7 is a drawing illustrating how two of the wavelength dependent multipath optical devices illustrated in FIG. 1 can be combined to generate an additional wavelength dependent optical path.

FIG. 7 indicates how two of the wavelength dependent multipath optical devices, 11 and 13 can be utilized to either combine three distinct wavelengths into one beam or to separate a beam having three distinct wavelengths into their respective components. In FIG. 7 the dichroic layers and the various unreflective layers have been eliminated for simplicity of illustration.

In the first optical device 11, the optical components 10, 12 and 14 are labeled to correspond to the same parts as illustrated in FIG. 1. In the second optical device 13 a letter A has been added to the corresponding numbers used in FIG. 1. For example in FIG. 1, the first optically transparent member is identified by reference numeral 10. The corresponding component in FIG. 7 is identified in the second optical device 13 by reference numeral 10a.

Assuming that the combination of devices illustrated in FIG. 7 is to be used to separate a light beam comprised of three distinct wavelengths into its components. The combination of devices operates as follows.

The beam comprising the three wavelengths λ1, λ2, and λ3 enters the flat end portion 32 of the first optically transparent member 10. A dichroic layer which is transparent to λ3 and reflective to λ1 and λ2 is positioned at the interface of the first and second optically transparent members 10 and 14. This causes the beam comprising λ3 to be transmitted through the second optical member 14 and exit along its flat surface 34 as illustrated. Similarly, the portions of the beam comprising λ1 and λ2 are transmitted along the optical axis of optically transparent member 12 and enter the flat end surface of optically transparent member 10a. A dichroic layer which is reflective to λ1 and transparent to λ2 is positioned at the junction of first and second optically transparent members 10a and 14a. This causes the portion of the original beam comprising λ2 to be transmitted through the second optically transparent member 14a and exit along the flat surface 34a of this member as illustrated. Similarly, the dichroic layer reflects the portion of the beam comprising a wavelength λ1 with portion of the beam exiting along the flat end surface 33a of optically transparent member 12a. Thus, the original beam comprising three distinct wavelengths has been separated into its three distinct components. Since the system is bi-directional as previously described, three beams having wavelengths λ1, λ2, and λ3 can be combined to generate the original waveform by reversing the directions of transmission described above.

It is obvious that many combinations of beam directions can be accomplished using the same device. For example, λ1 can be transmitted in one direction and λ2, λ3 in the other. Also optical members 12 and 10a could be made as a single member.

Figure 8:
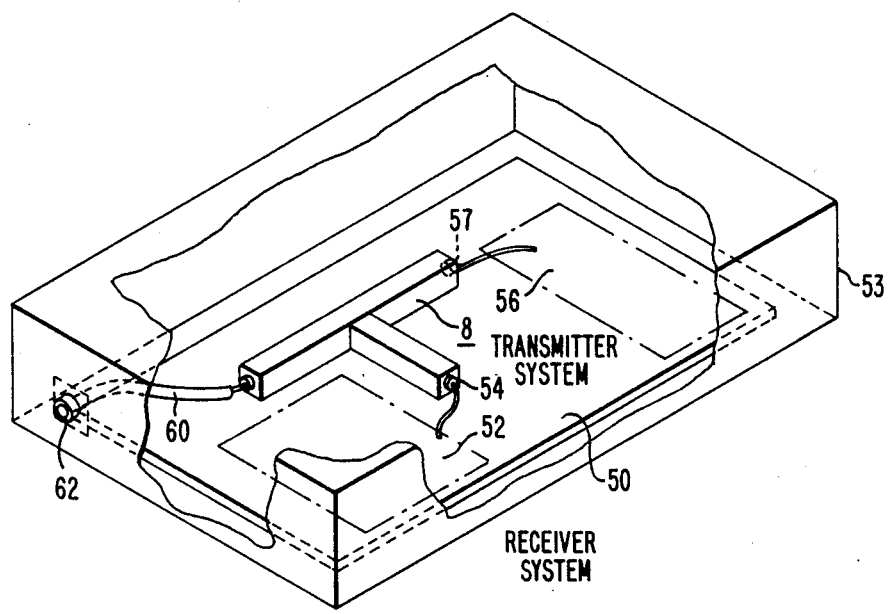
FIG. 8 is a diagram illustrating the use of the wavelength dependent multipath optical device illustrated in FIG. 1 to interface an optical fiber to a transmitter and a receiver.

FIG. 8 illustrates the use of the multipath optical device 8 illustrated in FIG. 1 to transmit and receive information over an optical fiber 60. The multipath optical device 8 is affixed to a circuit board 50. Circuit board 50 also has affixed thereto a receiver 52 and a transmitter 56. The circuit board 50 is then mounted in a suitable enclosure 53 portions of which are cut away for purposes of illustration.

In all cases the receiver 52 will include all of the circuitry or apparatus necessary to process the output signal of a light sensor 54 which is affixed to an end surface of the multipath apparatus 8 to detect the received optical signal. The details of the transmitter 56 will similarly depend on the type and volume of data to be transmitted, however, in all cases it will include all of necessary apparatus to process the data to be transmitted to generate a signal to drive a light emitting source 57 which is affixed to the end of the multipath optical apparatus 8. The function of the light emitter 57 is to emit a light signal of the proper wavelength and modulated with the data for transmitting via the optical apparatus 8. The dichroic layers of the light transmitting apparatus 8 are selected such that the modulated light signal generated by the light emitting source 57 is transmitted through this layer and arrives as an input to a fiber optical cable 60. The fiber optic cable 60 is affixed to the end of the multipath light apparatus 8 such that light emitted by the light emitting source 57 is focused on the end of the fiber optic cable. The second end of fiber optic cable 8 terminates in a connector 62. Optically transparent materials having a graded index or refraction which are suitable for fabricating the optical components discussed above are commercially available. Similarly, the optical components may be fabricated using well known techniques. Suitable adhesive for joining the component and materials for the dichroic layers are also commercially available.

Light sensing device 54 is positioned such that light received via the fiber optic cable 60 is focused thereon. Thus, two systems such as the one illustrated in FIG. 6 can be used to form a system to transmit and receive light modulated signals via a fiber optic cable connecting the two systems.

We claim:

1. An optical system comprising
   (a) a wavelength dependent multipath optical transmission device having at least first and second optical paths therethrough, including;
      (1) first and second optically transparent members each having an optical axis, a substantially square cross section and first and second ends;
      (2) a dichroic layer positioned between said second ends of said first and second members such that said optical axes of said first and second members are positioned end to end and substantially parallel with respect to each other, with said dichroic layer being positioned at an angle of substantially forty-five degrees with respect to said optical axes of said first and second optically transparent members;
      (3) a third optically transparent member having an optical axis, having first and second ends and a substantially square cross section;
      (4) means for affixing said third optically transparent member to said first optically transparent member such that the optical axis of said third transparent member intersects the optical axis of said first optically transparent member with the point of intersection and said second end of said first optically transparent member substantially coinciding; and
      (5) first, second, third and fourth anti-reflective layers respectively affixed to said first ends of said first, second and third optically transparent members and to the longest edge of said second optically transparent member to reduce reflections which may occur at the edge surface of said second optically transparent member as a result of partial reflection at said dichroic layer;
   (b) an optical fiber coupled to receive optical energy from and couple optical energy to said first optically transparent member;
   (c) transmitting means for generating an optical beam and coupling said optical beam to said optical fiber via one of said wavelength dependent paths; and
   (d) receiving means coupled to receive optical energy from said optical fiber via a second one of said wavelength dependent optical paths.

2. An optical system in accordance with claim 1 wherein said first and second optical members have an optical axis, a first substantially square end positioned at substantially a right angle to said optical axis and a second rectangular end positioned at an angle of substantially 45 degrees to said optical axis.

3. An optical system in accordance with claim 1 wherein said optical fiber is affixed to said substantially square end of said first optically transparent member.

4. An optical system in accordance with claim 3 wherein said optical beam generated by said transmitter is coupled to said substantially square end of said second optically transparent member.

5. An optical system in accordance with claim 4 wherein said receiving means is coupled to one of said square ends of said third optically transparent member.

6. An optical transmission device comprising:
   (a) first and second optically transparent members of substantially rectangular cross section each having an optical axis and a graded index of refraction, each having a first end substantially flat and perpendicular to said optical axis and a second substantially flat end inclined to said optical axis, said first and second ends being coextensive with the cross section of said first and second optically transparent members;
   (b) a dichroic layer positioned between and affixed to said second ends of said first and second members such that said optical axes of said first and second members are positioned end-to-end and substantially parallel with respect to each other with the distance between said first ends of said first and second optically transparent members being one focusing length;
   (c) a third optically transparent member of substantially rectangular cross section having an optical axis and first and second substantially flat ends;
   (d) means for affixing said first substantially flat end of said third optically transparent member to said first optically transparent member such that said optical axis of said third member intersects said optical axis of said first optical member, the distance between said first end of said first optically transparent member and said second substantially flat end of said third optically transparent member being one focusing length; and
   (e) first, second, third and fourth anti-reflection coatings respectively affixed to said first end of said first optically transparent member, to said first end of said second optically transparent member and to said second end of said third optically transparent member and to said second optical member at a location opposite said third optically transparent member selected to reduce internal reflections due to partial reflections of said dichroic layer.

7. An optical transmission device comprising:
   (a) first and second optically transparent members each having an optical axis, a substantially square cross section and first and second ends;
   (b) a dichroic layer positioned between said second ends of said first and second members such that said optical axes of said first and second members are positioned end to end and substantially parallel with respect to each other, with said dichroic layer being positioned at an angle of substantially forty-five degrees with respect to said optical axes of said first and second optically transparent members;
   (c) a third optically transparent member having an optical axis, having first and second ends and a substantially square cross section;
   (d) means for affixing said third optically transparent member to said first optically transparent member such that the optical axis of said third transparent member intersects the optical axis of said first optically transparent member with the point of intersection and said second end of said first optically transparent member substantially coinciding; and
   (e) first, second, third and fourth anti-reflective layers respectively affixed to said first ends of said first, second and third optically transparent members and to the longest edge of said second optically transparent member to reduce reflections which may occur at the edge surface of said second optically transparent member as a result of partial reflection at said dichroic layer.

* * * * *